United States Patent [19]

O'Neill

[11] Patent Number: 5,088,629
[45] Date of Patent: Feb. 18, 1992

[54] PRESSURE BUILD-UP PUMP SPRAYER HAVING IMPROVED VALVING MEANS

[76] Inventor: Richard K. O'Neill, P.O. Box 2452, Wrightwood, Calif. 92397

[21] Appl. No.: 560,087

[22] Filed: Jul. 30, 1990

[51] Int. Cl.⁵ .............................................. G01F 11/00
[52] U.S. Cl. ..................................... 222/321; 222/341; 222/383; 222/385; 239/333
[58] Field of Search ............... 222/321, 341, 378, 383, 222/385; 239/333

[56] References Cited

U.S. PATENT DOCUMENTS

| | | | |
|---|---|---|---|
| 3,159,316 | 12/1964 | O'Donnell et al. | 222/321 |
| 3,908,870 | 9/1975 | Nozawa et al. | 222/321 |
| 4,017,031 | 4/1977 | Kishi et al. | 239/333 |
| 4,025,046 | 5/1977 | Boris | 222/321 X |
| 4,174,790 | 11/1979 | Nozawa et al. | 222/385 X |
| 4,183,449 | 1/1980 | Blake | 239/333 X |
| 4,361,255 | 11/1982 | Saito et al. | 222/321 |
| 4,365,729 | 12/1982 | Saito et al. | 222/321 |
| 4,530,449 | 7/1985 | Nozawa et al. | 222/383 X |
| 4,923,094 | 5/1990 | O'Neill | 222/378 X |
| 4,941,595 | 7/1990 | Montanet et al. | 222/321 |

FOREIGN PATENT DOCUMENTS 2632662 1/1977 Fed. Rep. of Germany ...... 239/333
2310613 12/1976 France .................................. 222/321

Primary Examiner—Michael S. Huppert
Assistant Examiner—Anthoula Pomrening
Attorney, Agent, or Firm—Hawes & Fischer

[57] ABSTRACT

A manually actuated, pressure build-up pump sprayer that is to be interconnected with a container for atomizing and spraying a liquid from the container. The pump sprayer includes air-tight seals and valves which are opened and closed at different portions of the stroke cycle, such that trapped air may be quickly compressed and efficiently blown from the poppet into the container and liquid from the container drawn into the poppet and sprayed from the spray head. Thus, the sprayer may be easily primed after only a few stroke cycles. The sprayer is characterized by a relatively reduced number of parts and manufacturing cost as well as the ability to prevent leakage and allow spraying of the liquid in the event that the container is tipped or turned over.

18 Claims, 4 Drawing Sheets

PRESSURE BUILD-UP PUMP SPRAYER HAVING IMPROVED VALVING MEANS

BACKGROUND OF THE INVENTION

1. Field of the Invention

This invention relates to a relatively low cost, manually operated pressure build-up pump sprayer that has improved valving means and can be easily and efficiently primed, such that a liquid from an associated container can be atomized and sprayed after only a few stroke cycles.

2. Background Art

Conventional pressure build-up pump sprayers are typically manufactured from a relatively large number of parts. This large number of parts correspondingly results in a high manufacturing cost and an increase in the difficulty of manufacture, especially when molding of several parts is required. Moreover, the conventional pump sprayers are often difficult to assemble. Some pump sprayers have ineffective or inefficient seals, such that leakage becomes a problem, particularly if the liquid container is turned upside down or if the spray head is depressed, even slightly. Other pump sprayers require the application of a large actuating force to depress the spray head which often leads to user discomfort, especially if the sprayer is needed to spray a liquid for a long period of time. Still other pump sprayers have inefficient priming means and, consequently, must be stroked a large number of times before the sprayer can be air evacuated and filled with the liquid to be sprayed.

The presently disclosed pressure build-up pump sprayer overcomes many of the problems that are associated with conventional pump sprayers by virtue of a fewer number of parts, reduced cost, reliable sealing and valving, and an efficient priming means by which a relatively large volume of spray may be rapidly and efficiently dispensed after only a small number of priming strokes.

The pressure build-up pump sprayer that is described in this patent application is of the type that is disclosed in my earlier U.S. Pat. No. 4,923,094 issued May 8, 1990.

SUMMARY OF THE INVENTION

In general terms, a manually operated pressure build-up pump sprayer is disclosed to be interconnected with a container for atomizing various liquids, including, but not limited to, hair products, deodorants, perfumes, cosmetic preparations, and the like. The disclosed sprayer is manufactured from a relatively few number of parts at a correspondingly reduced cost and, therefore, can be more easily and quickly assembled when compared with conventional pump sprayers. More particularly, the pump sprayer of this invention comprises a removable protective hood, a cap to be detachably connected to a liquid container and having a suction tube extending therefrom into the container, a hollow, stationary valve housing that is molded into the cap and extends longitudinally therethrough, a hollow valve body that is slidably received within the valve housing, and a piston or poppet having a hollow pressure chamber and being coaxially aligned with said valve body and valve housing. The poppet is biased by a compression spring and adapted for reciprocal movement through the valve body, whereby air within the poppet chamber is compressed during a downstroke and, during the following up stroke, said chamber is evacuated and then filled with a liquid to be dispensed through a spray orifice of a spray head. A manual actuating force is successively applied to and removed from the spray head to control the reciprocal movement of the poppet through the valve body during the stroke cycle.

The valve body has an inwardly projecting ring which, in the at-rest position, is frictionally engaged by the poppet, whereby the valve body is retained against and in sealing engagement with the valve housing. During the downstroke, a manual force is applied to the spray head to cause the poppet to move downwardly through the valve body and the valve body to move downwardly through the valve housing. Accordingly, the spring is compressed and the seal between the valve body and the valve housing is opened to establish an air path therebetween and permit air from the atmosphere to enter the container. Moreover, during the downstroke, the suction tube which extends into the container is sealed by the valve body so that by the end of the downstroke, air within the pressure chamber of the poppet is fully compressed.

At the conclusion of the downstroke and the beginning of the following upstroke, the compressed spring expands, whereby to drive the poppet and spray head upwardly through the sprayer. The poppet includes a friction increasing bump extending radially outward therefrom which is moved into opposing frictional engagement with the inwardly projecting ring of the valve body. Hence, the poppet pulls the valve body upwardly for a short distance through the valve housing so as to open a fluid path between the pressure chamber of the poppet and the container via the suction tube. Accordingly, compressed air from the pressure chamber of the poppet is blown through the suction tube and into the container. As the poppet moves upwardly through the valve body, the pressure chamber of the poppet expands, whereby fluid from the container is drawn by suction into the pressure chamber via the suction tube. The fluid drawn into the pressure chamber is atomized and sprayed from the spray orifice of the spray head during a subsequent downstroke.

DESCRIPTION OF THE PREFERRED EMBODIMENT

Figure 1:
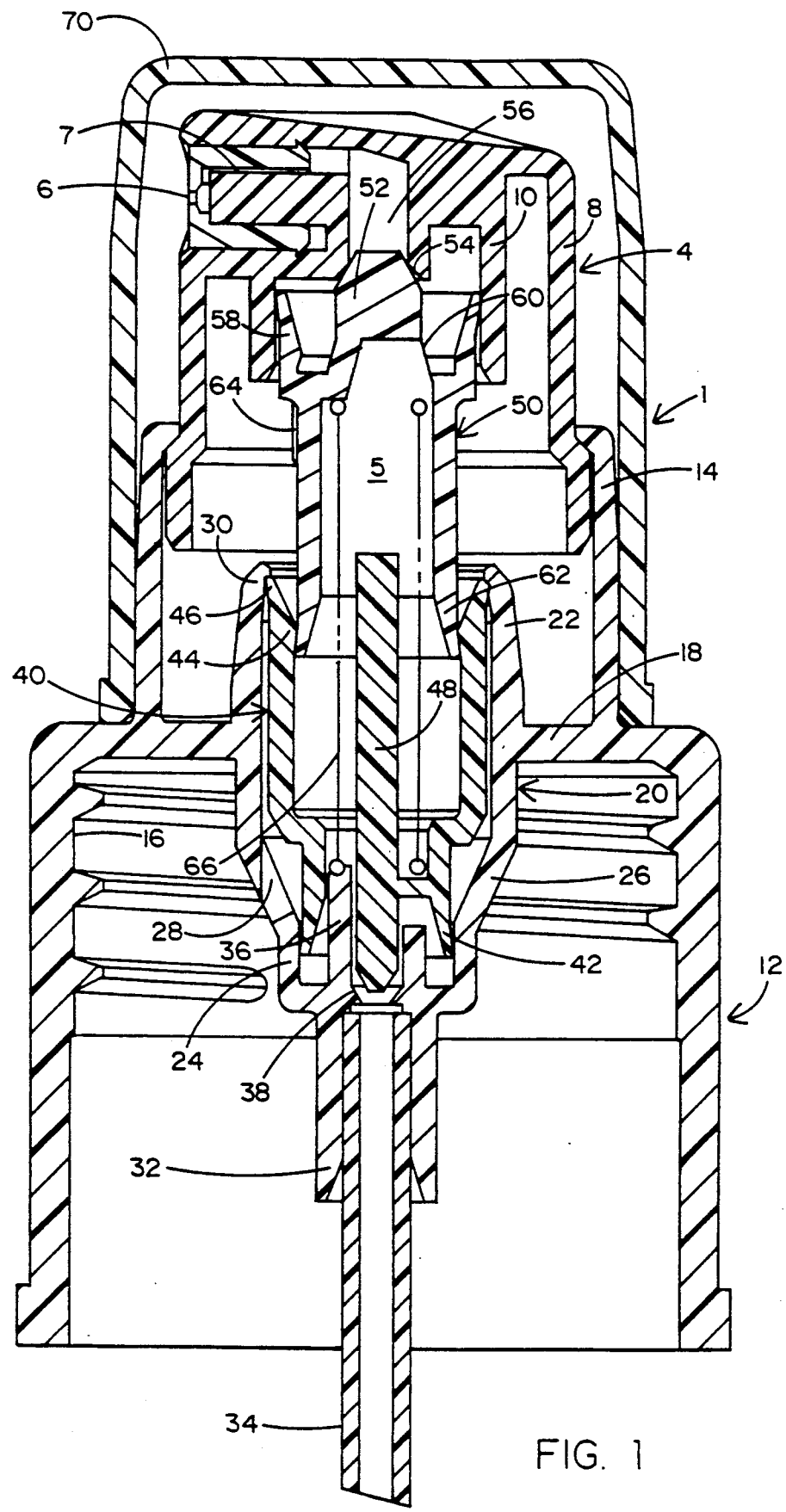
FIG. 1 is a cross-section of the pressure build-up pump sprayer of the present invention in the at-rest condition showing the improved valving means.

The pressure build-up pump sprayer having an improved valving means for efficiently atomizing and spraying a liquid is described while referring concurrently to FIGS. 1-4 of the drawings, where the sprayer 1 is shown with a detachable hood (designated 70 in FIG. 1) that surrounds a spray head 4 to which a downward force is to be manually applied. The spray head 4 has an orifice outlet 6 through which a liquid can be dispensed when the pump sprayer 1 is primed and the head 4 is depressed during a downstroke. A fluid passage 7 is formed through spray head 4 to communicate with and deliver liquid to outlet 6 from the pressure chamber 5 of a soon to be described piston/poppet 50. The head 4 also has concentrically aligned, inner and outer flanges 8 and 10 that move axially and reciprocally relative to a cap portion 12 during the down and up strokes of the sprayer.

The cap 12 is provided with a series of internal screw threads 16 by which the sprayer may be rotated into mating engagement with a series of complementary screw threads from a container (not shown). The container is of conventional configuration and is of the type that may be filled with a variety of different liquids including, but not limited to hair products, deodorants, perfumes, cosmetic preparations, and the like. The cap 12 includes an upwardly extending top wall 14 which slidably receives and guides the lower end of the outer, flange 8 of spray head 4 as the head reciprocates relative to the cap. Cap 12 also includes a radially extending end wall 18 and a hollow, stationary valve housing 20 which extends longitudinally through the cap.

Figure 4:
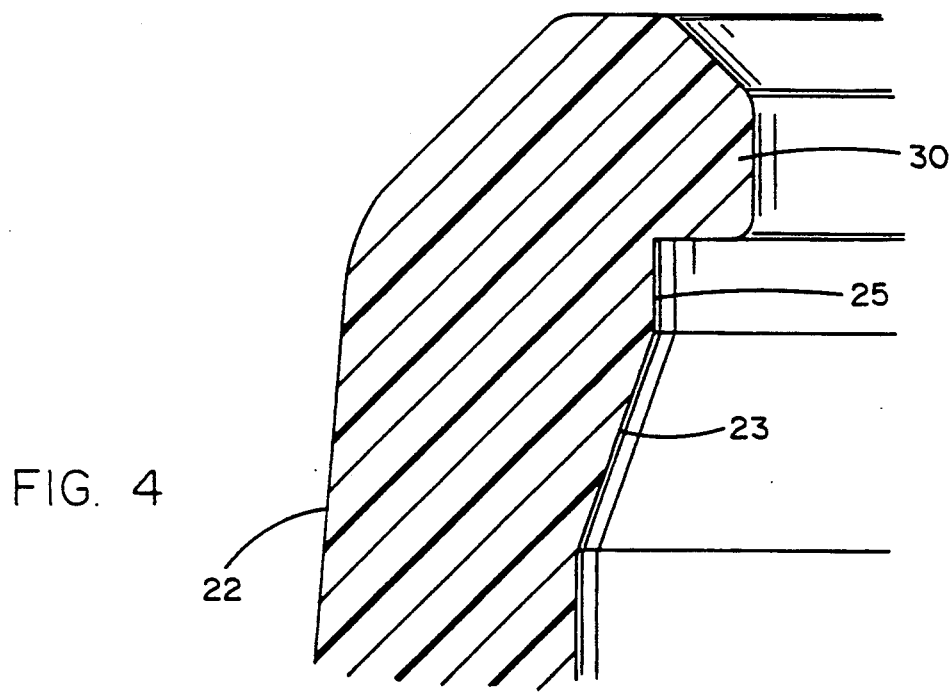
FIG. 4 is an enlarged detail showing the upper end of a valve housing which forms the pump sprayer.

Valve housing 20 has an upper cylindrical bore 22 of relatively wide diameter and a lower cylindrical bore 24 of relatively narrow diameter. Coextensively formed between the upper and lower bores 22 and 24 of the valve housing 20 is a conical interface 26 having a vent hole 28 extending therethrough. Referring briefly to FIG. 4 of the drawings, the top of valve housing 20 (i.e. above the upper bore 22) terminates at an inwardly turned lip 30. Between the upper bore 22 and lip 30 of valve housing 20 lies a tapered area 23 and a short, cylindrical upper sealing surface 25, the diameter of which is less than the diameter of upper bore 22. The bottom of valve housing 20 terminates at a downwardly projecting sleeve 32 in which one end of a suction tube 34 is received and retained. Also located at the bottom of valve housing 20 is a cylindrical, upwardly projecting valve guide 36, the function of which will soon be described. At least two integral support fingers 37 (only one of which being visible in drawings) extend upwardly from valve guide 36 through slots (not shown) formed in a soon to be described valve body 40 in order to support a compression spring 66 and position said spring so as not to interfere with the upward travel of the valve body 40, the details of which will now be described.

Received within the hollow valve housing 20 so as to be concentrically aligned and slidable longitudinally therethrough is a hollow valve body 40. Valve body 40 includes a lower skirt 42 that is disposed in sealing engagement against the lower bore 24 of valve housing 20. As an important detail of the present invention, the valve body 40 has a radially inward projecting ring 44 which forms an area of reduced diameter at the interior of body 40 and permits said valve body to be reliably engaged by a soon to be described poppet 50. A flared sealing head 46 projects radially outward from valve body 40 towards the upper bore 22 of valve housing 20. As will be described in greater detail, the flared sealing head 46 of valve body 40 is adapted to be positioned in and out of contact with the upper end of valve housing 20 to either form an air-tight seal or open an air vent to the container, depending upon whether a force is being applied to spray head 4.

Valve body 40 has a coaxially aligned valve stem 48 extending axially therethrough. The valve stem 48 of valve body 40 is received within and moved longitudinally through the valve guide 36 of valve housing 20. The valve stem 48 interacts with a lower valve seal 38 of valve housing 20 that is formed at the interface of sleeve 32 and suction tube 34. As will also be disclosed in greater detail, valve stem 48 is adapted to move onto and off the lower valve seat 38 to either seal suction tube 34 against the passage of air and liquid or open said tube to permit the pump sprayer 1 to be in fluid communication with the container to which the sprayer is attached.

Received within the hollow valve body 40 so as to be concentrically aligned with both valve body 40 and valve housing 20 and slidable through valve body 40 is a tubular piston assembly or poppet 50 having a hollow pressure chamber 5. The pressure chamber 5 of poppet 50 is disposed to communicate fluidically with the interior of the container. The poppet 50 includes an upwardly projecting poppet valve 52 which (in the at rest condition of FIG. 1) is normally biased so as to lie flush against an upper valve seat 54 and be received within and thereby close a valve opening 56 that communicates with the fluid passage 7 and outlet orifice 6 of spray head 4. The receipt of poppet valve 52 against upper valve seat 54 and within valve opening 56 prevents liquid from leaking past the poppet valve 52 and through opening 56. However, during the downstroke of spray head 4, the poppet 50 is moved downwardly through valve body 40 and away from spray head 4 to open a passage (shown dotted in FIG. 2) through valve opening 56 so that fluid can be delivered from the pressure chamber 5 of poppet 50 to spray orifice 6 via fluid passage 7.

Coextensively connected to the upper end of the tubular poppet 50 is a cylindrical flange 58 which surrounds the poppet valve 52. Once the pump sprayer 1 has been primed, in a manner to be described below, the upper flange 58 of poppet 50 rides along and forms a fluid seal against the inner flange 10 of spray head 4 to prevent the premature loss of fluid from the container as poppet 50 moves through valve body 40 to open and close valve opening 56. Upper flange 58 is opened at one end so as to establish a fluid path between valve opening 56 and the pressure chamber 5 of popper 50 by way of an opening 60 through said poppet. An outwardly flared skirt 62 is coextensively connected to the lower end of poppet 50. Lower skirt 62 is slidably received within the valve body 40 so as to form a seal thereagainst to prevent the escape of liquid past the interface of poppet 50 with valve body 40 as the poppet slides reciprocally through said valve body to prime the pump sprayer 1.

As another important detail of the present invention, a raised friction increasing bump 64 projects radially outward from the tubular poppet 50 at a location between the upper cylindrical flange 58 and the lower skirt 62. Although a single bump 64 is illustrated and described, it is to be expressly understood that two or more bumps or a continuously raised ridge may be formed around the periphery of poppet 50. As will soon be described, the bump 64 of poppet 50 is positioned to be moved into frictional engagement with the ring 44 of valve body 40 (FIG. 3) to cause poppet 50 and valve body 40 to move in unison through the valve housing 20.

A coiled compression spring 66 extends longitudinally through the interior of sprayer 1 between the pressure chamber 5 of poppet 50 and the support fingers 37 of the valve guide 36 of valve housing 20. The spring 66 surrounds the valve stem 48 of valve body 40 and is retained by stem 48 in coaxial alignment with valve housing 20, valve body and poppet 50. Spring 66 is fully compressed (best shown in FIG. 3) at the conclusion of the downstroke as the poppet 50 slides downwardly to its lowest position in the valve body 40. The memory of spring 66 is responsible for automatically returning poppet 50 to its at rest position (of FIG. 1) at the beginning of the upstroke when said spring begins to expand.

The operation of the pressure-build up pump sprayer 1 of the present invention is now described while initially referring to FIG. 1 where the pump sprayer is shown in the at rest condition with the hood 70 detachably connected to and surrounding the upper wall 14 of cap 12. In the at-rest condition (with no downward force being applied to spray head 4), the coil spring 66 biases the poppet 50 to its upper-most position relative to valve body 40 and spray head 4. Thus, the poppet valve 52 at the upper end of poppet 50 is received upon upper valve seat 54 to seal valve opening 56, the upper cylindrical flange 58 of poppet 50 is sealed against the inner flange 10 of spray head 4, the flared skirt 62 at the lower end of said poppet is received in sealing engagement against valve body 40 and the lower skirt 42 of valve body 40 is sealed against the lower bore 24 of valve housing 20. Moreover, and by virtue of ring 44 being engaged by the skirt 62 of poppet 50, the valve body 40 is retained at its upper-most position relative to the stationary valve housing 20 of cap 12, such that the outwardly flared sealing head 46 at the upper end of valve body 40 is received below the inwardly turned lip 30 of valve housing 20 and in sealing engagement against the upper sealing surface 25 thereof (of FIG. 4), and the outwardly flared skirt 42 at the lower end of valve body 40 is sealed against the lower bore 24 of said valve housing 20. Accordingly, fluid paths between the container and the atmosphere are reliably sealed in the at rest condition of FIG. 1.

Figure 2:
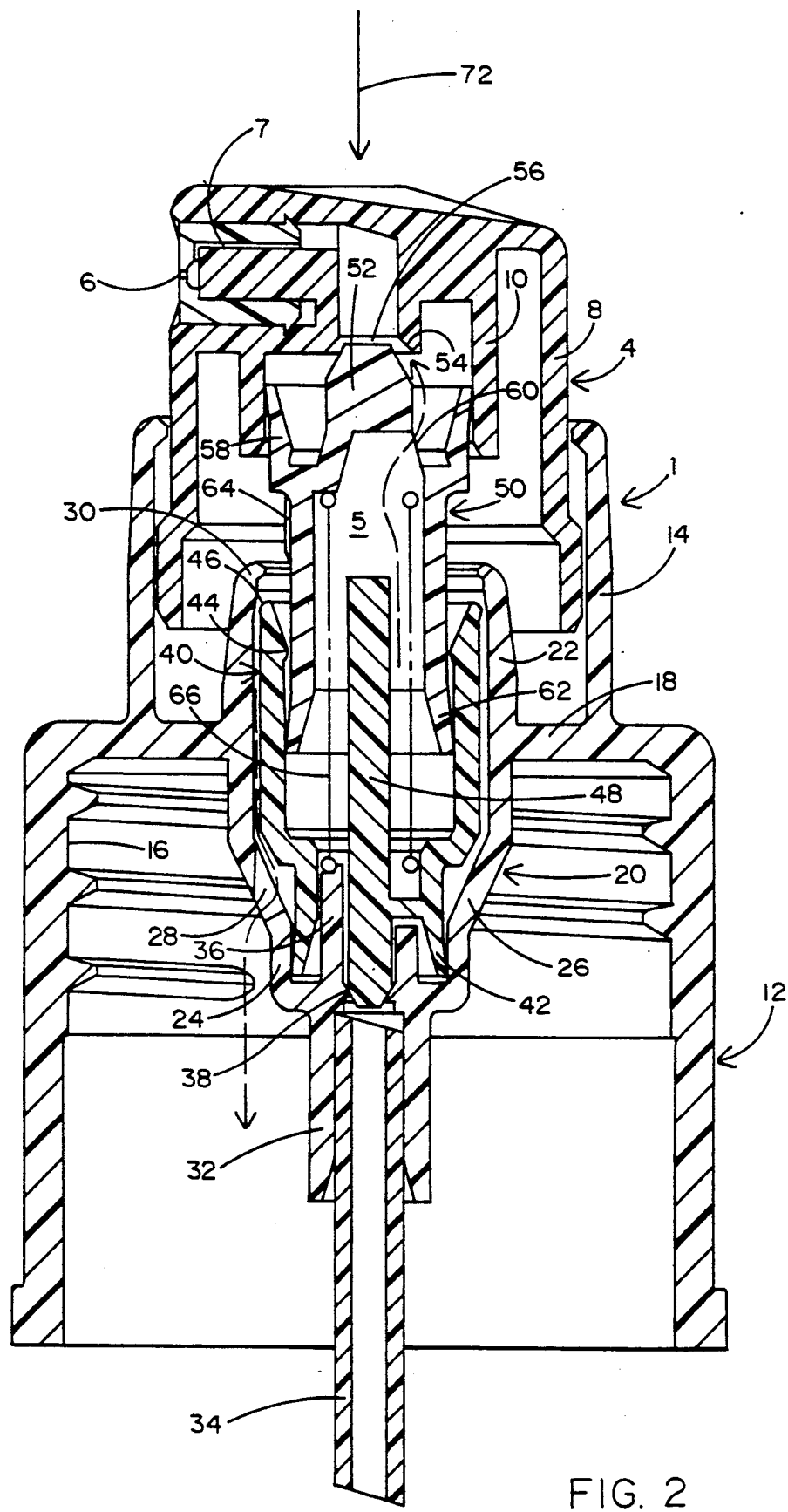
FIG. 2 is a cross-section of the pump sprayer of FIG. 1 during a downstroke of the stroke cycle.

Referring now to FIG. 2, the pump sprayer 1 is shown in the middle of a downstroke with the hood (70 of FIG. 1) removed and a downward force (represented by reference arrow 72) being manually applied to the spray head 4 so that a liquid can be expulsed through spray orifice 6. More particularly, the application of a downward force to spray head 4 causes the spray head to slide downwardly along the upper wall 14 of cap 12 to thereby compress spring 66. With the pump sprayer 1 primed, the pressure created as a result of the downward movement of spray head 4 correspondingly causes the poppet 50 to move downwardly through the valve body 40, whereby poppet valve 52 is urged off the upper valve seat 54 to open a flow path (shown dotted) from the pressure chamber of poppet 50 to the spray orifice 6 via poppet opening 60, valve opening 56, and fluid passage 7.

At the same time that poppet 50 moves through valve body 40, the lower skirt 62 of said poppet 50 moves off the inwardly projecting ring 44 and downwardly through said valve body 40. Accordingly, the valve body 40 is engaged by and moved with lower skirt 62 downwardly through the valve housing 20, whereby the sealing head 46 of valve body 40 is moved off the upper sealing surface 25 of valve housing 20. Thus, the earlier described seal (of FIG. 1) formed between sealing head 46 of valve body 40 and the upper sealing surface 25 of valve housing 20 during the at rest condition of sprayer 1 is opened and a path (shown dotted) is created therebetween through which air from the atmosphere is vented to the interior of the container via the vent hole 28 in valve housing 20. The air vent seal between valve body 40 and valve housing 20 remains open for the duration of the downstroke.

The friction at the interface between the lower skirt 62 of poppet 50 and the valve body 40 causes said valve body to shift towards it lowermost position within valve housing 20 as poppet 50 moves downwardly in response to the force applied to spray head 4. Thus, the valve stem 48 of valve body 40 is urged towards and into contact with the lower valve seat 38 to seal off the suction tube 34. What is more, the volume of the pressure chamber of poppet 50 is decreased, such that air trapped within said pressure chamber will be compressed as said poppet is moved towards its lower-most position within valve body 40.

Figure 3:
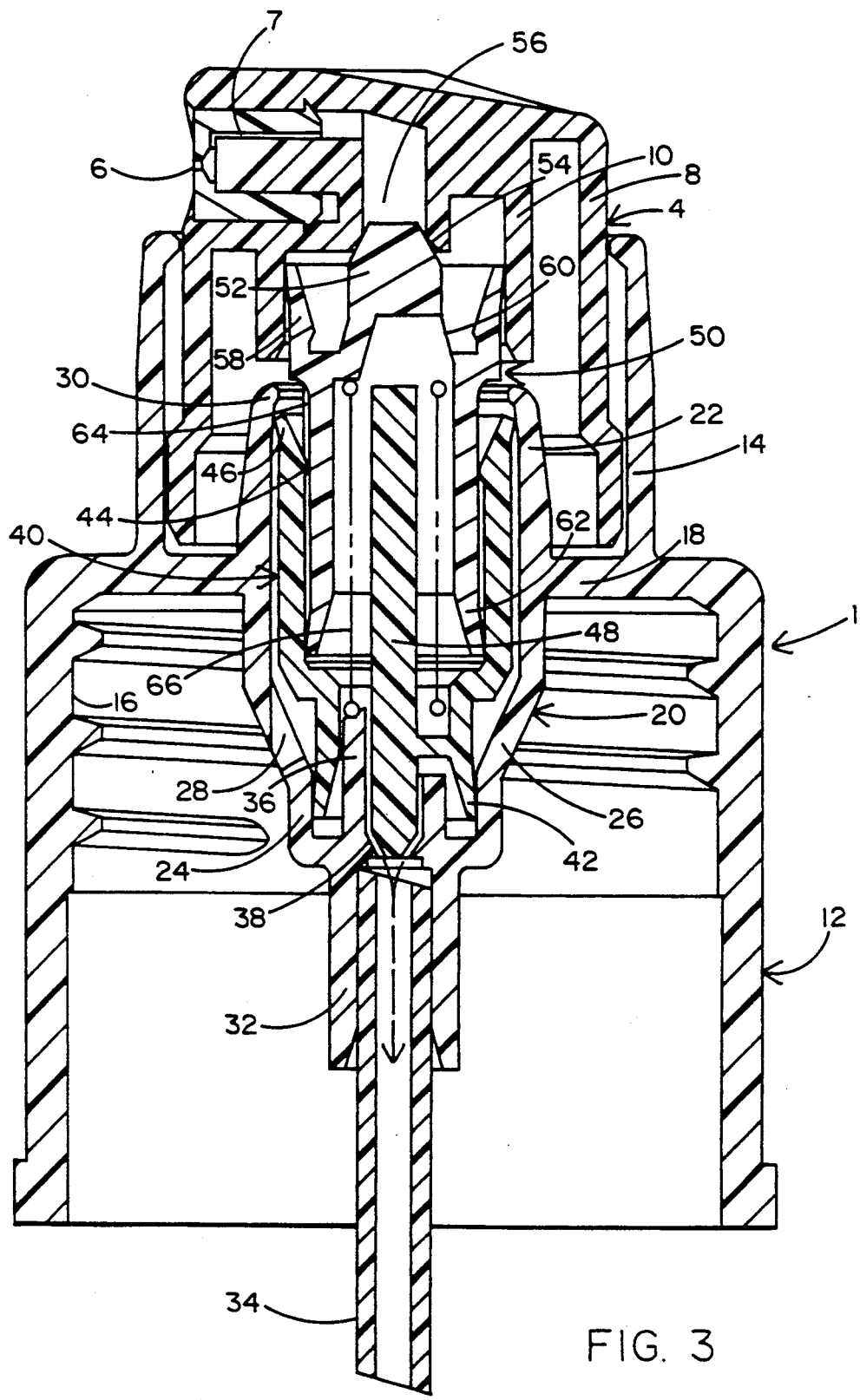
FIG. 3 is a cross-section of the pump sprayer at the conclusion of the downstroke and the beginning of the following upstroke of the stroke cycle.

FIG. 3 of the drawings shows the end of the downstroke when the manual force 72 applied to spray head 4 is removed and the potential energy stored by spring 66 in its compressed state is released to drive valve body 40, poppet 50 and spray head 4 back towards their at rest positions of FIG. 1. At the conclusion of the downstroke and the very beginning of the upstroke, the poppet 50 is located within valve body 40 such that the raised friction increasing bump 65 which projects radially outward therefrom is located in opposing frictional engagement with the ring 44 which projects inwardly from the upper end of valve body 40. Moreover, the poppet 50 is positioned against the spray head 4 such that the seal between poppet valve 52 and upper valve seat 54 is reestablished to block the passage between the pressure chamber 5 of poppet 50 and valve opening 56.

As the poppet 50 is driven upwardly by spring 66, the valve body 40 is carried a short distance by said poppet towards the inwardly turned lip 30 of valve housing 20. That is, the subsequent engagement of the sealing head 46 of valve body 40 by the lip 30 of valve housing 20 will restrict the upward distance over which the valve body 40 is pulled by poppet 50 during the upstroke. However, as valve body 40 is moved upwardly through valve housing 20 during the beginning of the upstroke, the valve stem 48 of valve body 40 is correspondingly moved upwardly and off the lower valve seat 38. Accordingly, with the air in the pressure chamber 5 of poppet 50 compressed (at the conclusion of the downstroke) and the air-tight seals between valve body 40 and valve housing 20 and between the skirt 62 of poppet 50 and valve body 40 and between poppet valve 52 and upper valve seat 54 simultaneously in place, the compressed air within poppet 50 is blown into the container via suction tube 34.

After the air is blown out of the poppet 50 and said poppet continues its upward travel during the upstroke, the pressure chamber therewithin begins to expand so as to create a vacuum and draw in fluid by means of suction from the container via suction tube 34. Once the poppet is filled with fluid, hydraulic pressure will cause the valve body 40 to automatically slide up and down within valve housing 20 during subsequent stroke cycles of the spray head 4, whereby fluid from the container may be successively supplied from poppet 50 to outlet orifice 6 (via the flow path shown dotted in FIG. 2) during a downstroke and from the container to the poppet (via suction tube 34) during a following upstroke.

It may therefore be appreciated that by virtue of the present invention, a manually operated, pressure build-up pump sprayer may be easily and efficiently primed. That is to say, air trapped within the pressure chamber of the poppet can be blown into the container and fluid from the container can be supplied to the pressure chamber of the poppet within a relatively few number of stroke cycles. Moreover, the number of component parts of the pump sprayer and the corresponding cost of manufacture is minimized relative to the number of parts and cost that characterize conventional sprayers. The present pump sprayer includes a series of reliable seals which advantageously prevent leakage in the event that the fluid container is tipped or turned upside down. In addition, the reliable seals and efficient valving means will allow liquid to be sprayed, regardless of the orientation of the container to which the pump sprayer is attached.

It will be apparent that while a preferred embodiment of the invention has been shown and described, various modifications and changes may be made without departing from the true spirit and scope of the invention. Having thus set forth a preferred embodiment of the invention, what is claimed is:

1. A manually operated, pressure build-up pump sprayer for dispensing a liquid from a container, said pump sprayer comprising:

cap means to be removably connected to the container, said cap means having a stationary bore extending longitudinally therethrough, and said bore having a sealing surface at the interior thereof;

hollow valve body means received within and slidable reciprocally through the bore of said cap means;

poppet means having a hollow pressure chamber to communicate fluidically with the interior of the container and also having a skirt projecting outwardly therefrom, said poppet means being received within and slidable reciprocally through said valve body means between first and second locations, such that at said first location, the outwardly projecting skirt of said poppet means engages said valve body means to position said valve body means in sealing engagement with the sealing surface of the bore of said cap means to form an air tight seal therebetween and, at said second location, the outwardly projecting skirt of said poppet means releases said valve body means for permitting said valve body means to slide away from and out of engagement with the sealing surface of the bore of said cap means to break the seal between said valve body means and said bore and thereby open an air vent from the atmosphere to the interior of the container; and spray head means having a spray orifice through which the liquid from the container is dispensed, said spray head means being interconnected with and slidable reciprocally relative to said cap means in response to a manually applied force for causing said poppet means to slide through said valve body means and said valve body means to slide through the bore of said cap means.

2. The pump sprayer recited in claim 1, wherein the bore of said cap means includes a vent hole formed therethrough, the vent hole in said bore and the air vent between said bore and said valve body means establishing an air path when said poppet means slides from said first to said second location by which air from the atmosphere is vented to the interior of the container.

3. The pump sprayer recited in claim 1, wherein said hollow valve body means includes a region of reduced diameter extending radially inward towards the interior of said valve body means, said region of reduced diameter being engaged by the skirt of said poppet means when said poppet means is at said first location for holding said valve body means in sealing engagement with the sealing surface of the bore of said cap means.

4. The pump sprayer recited in claim 3, wherein said radially inward extending region of reduced diameter of said valve body means includes a ring extending around the periphery of said valve body means at the interior thereof.

5. The pump sprayer recited in claim 1, wherein the outwardly projecting skirt of said poppet means rides along the interior of said valve body means as said poppet means slides between said first and second locations.

6. The pump sprayer recited in claim 1, wherein said poppet means also has a friction increasing surface projecting outwardly therefrom and spaced axially from said skirt, said friction increasing surface engaging said valve body means at said second location and causing said valve body means to slide towards the sealing surface of the bore of said cap means when said poppet means slides from said second to said first location.

7. The pump sprayer recited in claim 6, wherein the outwardly projecting friction increasing surface of said poppet means is a raised bump extending radially outward from said poppet means.

8. The pump sprayer recited in claim 6, wherein the bore of said cap means includes a radially inward projecting lip to contact said valve body means and thereby limit the movement of said valve body means in a direction towards the sealing surface of said bore when said poppet means slides from said second to said first location.

9. The pump sprayer recited in claim 1, further comprising an opening located between and in fluid communication with the interior of the container and the pressure chamber of said poppet means so that said opening is closed and air is compressed within said pressure chamber when a manual force is applied to said spray head means and said poppet means slides through said valve body means from said first to said second location to reduce the volume of said pressure chamber, and said opening is opened to allow compressed air from said pressure chamber to be expulsed into the interior of the container via said opening when the manual force is removed from said spray head means and said poppet means slides through said valve body means from said second to said first location.

10. The pump sprayer recited in claim 9, further comprising a valve stem supported at the interior of and slidable with said valve body means through the bore of said cap means, said valve stem being received across said opening to close said opening and thereby block the communication between the container and the pressure chamber of said poppet means when said poppet means slides from said first to said second location, and said valve stem being removed from said opening to permit communication between the container and said pressure chamber when said poppet means slides from said second to said first location.

11. The pump sprayer recited in claim 10, further comprising a coil spring surrounding the valve stem of said valve body means and extending into the pressure chamber of said poppet means, said coil spring being compressed and storing energy when a manual force is applied to said spray head means and said poppet means slides from said first to said second location, and said coil spring expanding to release energy for driving said poppet means from said second to said first location when the force applied to said spray head means is removed.

12. The pump sprayer recited in claim 1, wherein the sealing surface of the bore of said cap means extends around the periphery of said bore and has a diameter which is smaller than the diameter of the remainder of said bore.

13. A manually operated, pressure build-up pump sprayer for dispensing a liquid from a container, said pump sprayer comprising:

cap means to be removably connected to the container, said cap means having a stationary bore extending longitudinally therethrough, and said bore having a sealing surface at the interior thereof;

hollow valve body means received within and slidable reciprocally through the bore of said cap means, said valve body means having an outwardly projecting sealing head and an inwardly projecting region of reduced diameter;

poppet means having a hollow pressure chamber to communicate fluidically with the interior of the container and also having outwardly projecting sealing skirt said poppet means being received within and slidable reciprocally through said valve body means between first and second locations, such that at said first location, said outwardly projecting sealing skirt engages the inwardly projecting region of reduced diameter of said valve body means to position the outwardly projecting sealing head of said valve body means in contact with the sealing surface of the bore of said cap and establish an air seal therebetween and, at said second location, said outwardly projecting sealing skirt of said poppet means is disengaged from the inwardly projecting region of reduced diameter of said valve body means to permit the outwardly projecting sealing head of said valve body means to move away from and out of contact with the sealing surface of the bore of said cap means to break the seal between said outwardly projecting sealing head and said sealing surface and open an air vent from the atmosphere to the interior of the container; and spray head means having a spray orifice through which the liquid from the container is dispensed, said spray head means being interconnected with and slidable reciprocally relative to said cap means in response to a manually applied force for causing said poppet means to slide through said valve body means and said valve body means to slide through the bore of said cap means.

14. The pump sprayer recited in claim 13, wherein the inwardly projecting region of reduced diameter of said valve body means is a peripheral ring extending radially inward from said valve body means toward the interior thereof.

15. The pump spray recited in claim 13, wherein the bore of said cap means has a vent hole formed therethrough, said vent hole and the air vent between the outwardly projecting sealing head of said valve body means and the sealing surface of the bore of said cap means establishing an air path by which air from the atmosphere is vented to the container.

16. The pump sprayer recited in claim 13, wherein the outwardly projecting sealing skirt of said poppet means rides along the interior of said valve body means in sealing engagement therewith as said poppet means slides between said first and second locations.

17. The pump sprayer recited in claim 13, wherein said poppet means also has a friction increasing surface projecting outwardly therefrom and spaced axially from said outwardly projecting sealing skirt, said friction increasing surface engaging the inwardly projecting region of reduced diameter of said valve body means when said poppet means is at said second location and causing said valve body means to slide towards the sealing surface of the bore of said cap means when said poppet means slides from said second to said first location.

18. The pump sprayer recited in claim 17, wherein the bore of said cap means includes a radially inward projecting lip to contact said valve body means and thereby limit the movement of said valve body means in a direction towards the sealing surface of said bore when said poppet means slides from the second to said first location.

* * * * *